United States Patent [19]

Wu

[11] Patent Number: 5,598,756
[45] Date of Patent: Feb. 4, 1997

[54] DEVICE FOR STOPPING AUTOMATICALLY AN OVERLOADED LATHE

[76] Inventor: Chin-Long Wu, No. 136-12, Young Ho Road, Ta-Ya Hsiang, Taichung Hsien, Taiwan

[21] Appl. No.: 412,878

[22] Filed: Mar. 29, 1995

[51] Int. Cl.⁶ .......................... B23B 21/00; B23B 29/14
[52] U.S. Cl. ........................... 82/134; 82/158; 82/160; 407/8
[58] Field of Search ........................... 82/133, 134, 139, 82/158, 160; 407/8–10

[56] References Cited

U.S. PATENT DOCUMENTS 5,251,522  10/1993  Wu ................................................ 82/158

FOREIGN PATENT DOCUMENTS 1230750  5/1986  U.S.S.R. .................................... 82/158
1813595  5/1993  U.S.S.R. .................................... 82/158

*Primary Examiner*—M. Rachuba
*Assistant Examiner*—Kenneth J. Hansen
*Attorney, Agent, or Firm*—Browdy and Neimark

[57] ABSTRACT

A device for stopping automatically an overloaded lathe comprises a support base, a front holding base, a rear holding base eccentric cam, a locating block, and a lathe tool. The front holding base is fastened with the front end of the support base by means of a screw which is fitted over by a resilient washer. The lathe tool has a handle which is fastened at the front end thereof with the front holding base. The rear holding base eccentric cam is fastened with the rear end of the support base by means of a screw which is fitted over by a resilient washer. The handle of the lathe tool is urged at the rear end thereof by the rear holding base eccentric cam. The locating block is fastened with the support base and is provided with a proximity switch having an electric circuit connected with the electric circuit of the main shaft motor of the lathe. The rear end of the handle of the lathe tool is urged by the locating block.

12 Claims, 5 Drawing Sheets

DEVICE FOR STOPPING AUTOMATICALLY AN OVERLOADED LATHE

FIELD OF THE INVENTION

The present invention relates generally to a lathe, and more particularly to a device for stopping automatically an overloaded lathe.

BACKGROUND OF THE INVENTION

The conventional lathe is provided with a lathe tool which is mounted fixedly on a tool mount. When the lathe tool is impacted on excessively by a work piece, the lathe tool remains stationary. As a result, the lathe tool and the tool mount are highly vulnerable to damage, thereby bringing about a work interruption calling for an expensive repair work. The conventional method of preventing such an incident as described above from taking place is carried out by a feedback system, which is rather primitive and is therefore ineffective at best.

SUMMARY OF THE INVENTION

It is therefore the primary objective of the present invention to provide a device which is capable of bringing about the displacement of an overloaded lathe tool at the same time when impact incident takes place and is further capable of causing a power interruption and stopping the lathe in operation at the same time when the impact incident takes place.

It is another objective of the present invention to provide a device which is capable of stopping automatically an overloaded lathe tool and is simple in construction.

It is still another objective of the present invention to provide a device which is capable of stopping automatically an overloaded lathe tool and is suitable for use in a conventional lathe as well as a CNC lathe.

It is still another objective of the present invention to provide a device which is capable of stopping automatically an overloaded lathe tool without undermining the efficiency of the lathe.

The foregoing objectives, features, functions and advantages of the present invention will be more readily understood upon a thoughtful deliberation of the following detailed description of the present invention in conjunction with the accompanying drawings.

DETAILED DESCRIPTION OF THE INVENTION

Figure 1:
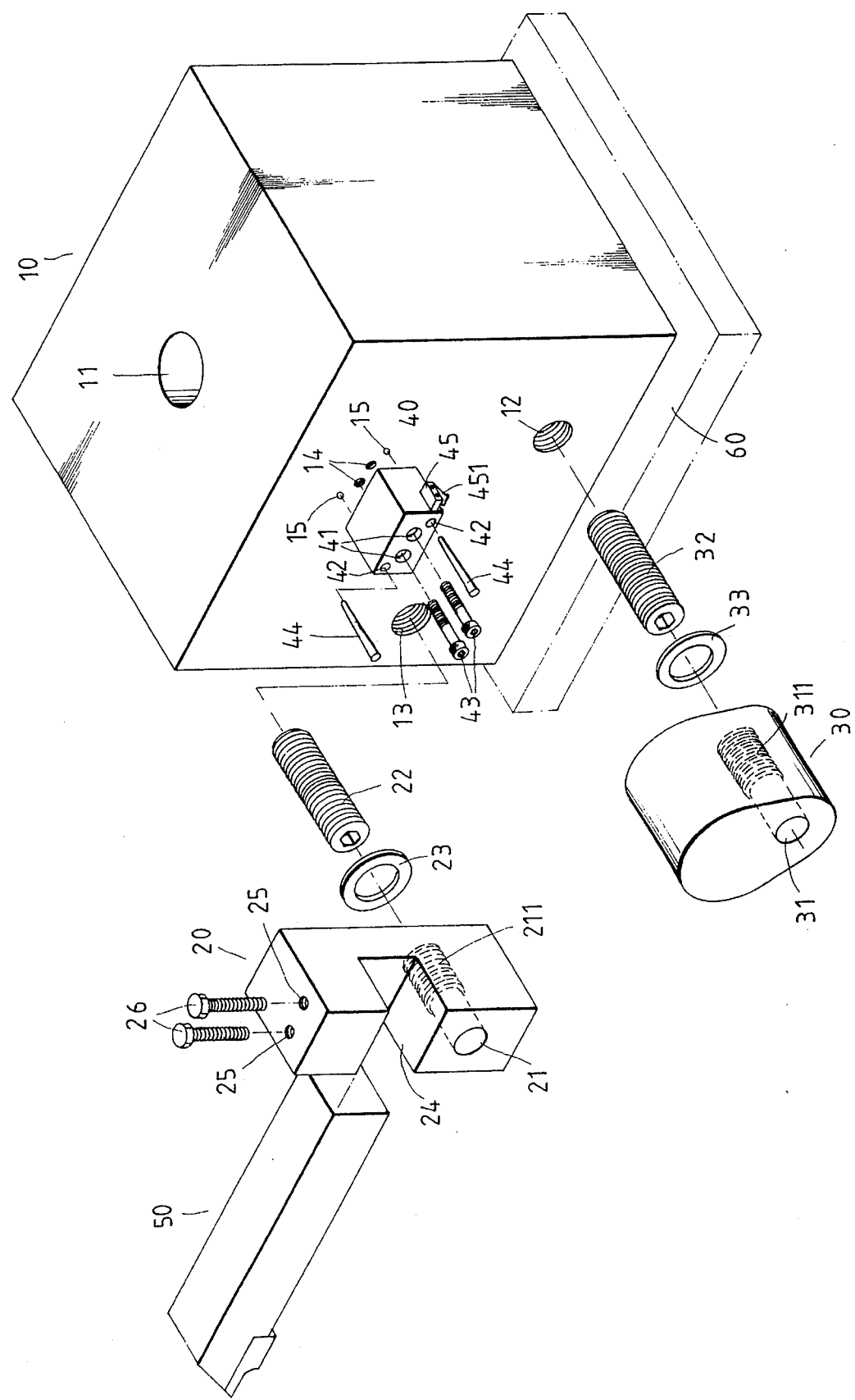
FIG. 1 is an exploded view showing that a first preferred embodiment of the present invention is incorporated into a conventional lathe tool mount of a square construction.
Figure 2:
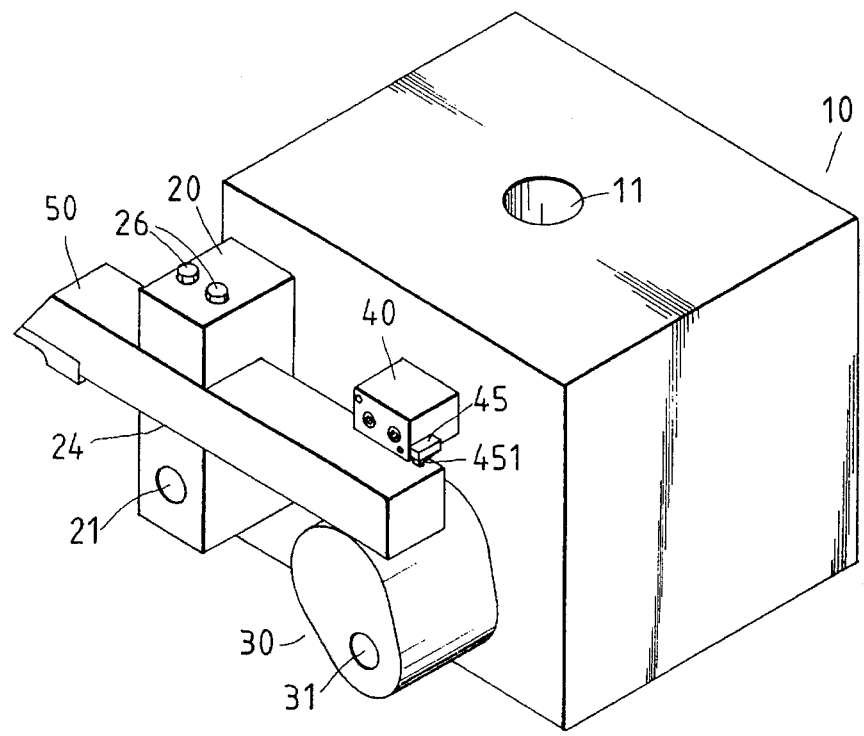
FIG. 2 shows a perspective view of the first preferred embodiment in combination according to the present invention as shown in FIG. 1.

As shown in FIGS. 1 and 2, the present invention comprises a support base 10, a front holding base 20, a rear holding base eccentric cam 30, a locating block 40, and a lathe tool 50.

The support base 10 is provided longitudinally at the top thereof with a through hole 11 engageable with the spindle of a tool support base 60 and is further provided laterally with four threaded holes 12, 13, 14, and two pin holes 15.

The front holding base 20 is provided at the lower portion of the front end thereof with a through hole 21 having at the rear end thereof a threaded portion 211 engageable with the front end of a screw 22 whose rear end is engageable with the threaded hole 13 of the support base 10. In other words, the front holding base 20 is fastened with the left side of the support base 10 such that the front holding base 20 is in a fastening state when the front holding base 20 is caused to rotate counterclockwise, and that the front holding base 20 is in an unfastening state when the front holding base 20 is caused to rotate clockwise. A resilient washer 23 is used to prevent the front holding base 20 from becoming unfastened when the machining process is under way. The front holding base 20 is further provided at the front end thereof with a slot 24 dimensioned to receive therein a handle of the lathe tool 50. The slot 24 is provided with two threaded holes 25 engageable with two screws 26 for fastening the lathe tool 50.

The rear holding base eccentric cam 30 is provided with a through hole 31 having at the rear end thereof a threaded portion 311 engageable with the front end of a screw 32 whose rear end is engageable with the threaded hole 12 of the support base 10. In other words, the rear holding base eccentric cam 30 is fastened with the right side of the support base 10 such that the rear holding base eccentric cam 30 is fastened when the rear holding base eccentric cam 30 is caused to rotate clockwise, and that the rear holding base eccentric cam 30 is unfastened when the rear holding base eccentric cam 30 is caused to rotate counterclockwise. The rear holding base eccentric cam 30 is so disposed that its upper end urges the underside of the rear end of the handle of the lathe tool 50. In addition, a resilient washer 33 is fitted over the screw 32 such that the resilient washer 33 is located between the rear holding base eccentric cam 30 and the support base 10 for preventing the rear holding base eccentric cam 30 from becoming unfastened when the machining process is in progress.

The locating block 40 is provided at the front end thereof with two through holes 41 engageable with two screws 43 and is further provided with two pin holes 42 dimensioned to receive therein two pins 44. In other words, the locating block 40 is secured to the right side of the support base 10 by means of the two screws 43 and the two pins 44 such that the upper side of the rear end of the lathe tool 50 is urged by the locating block 40. In addition, the locating block 40 is provided at the rear end thereof with a proximity switch 45 having a press plate 451 and a circuit which is connected with the circuit of the lathe main shaft motor. As the press plate 451 of the proximity switch 45 is pressed, the main shaft motor of the lathe is started. On the other hand, when the press plate 451 of the proximity switch 45 is relieved of the pressure exerting thereon, the main shaft motor of the lathe is stopped.

The lathe tool 50 has a handle which is secured at the front end thereof in the slot 24 of the front holding base 20 by means of screws 26. The handle of the lathe tool 50 is urged upwardly at the rear end thereof by the rear holding base eccentric cam 30 such that the rear end of the handle is pressed against the underside of the locating block 40, and that the lathe tool 50 is located horizontally at an operating position, and further that the press plate 451 of the proximity switch 45 is pressed by the tail end of the handle of the lathe tool 50.

Figure 3:
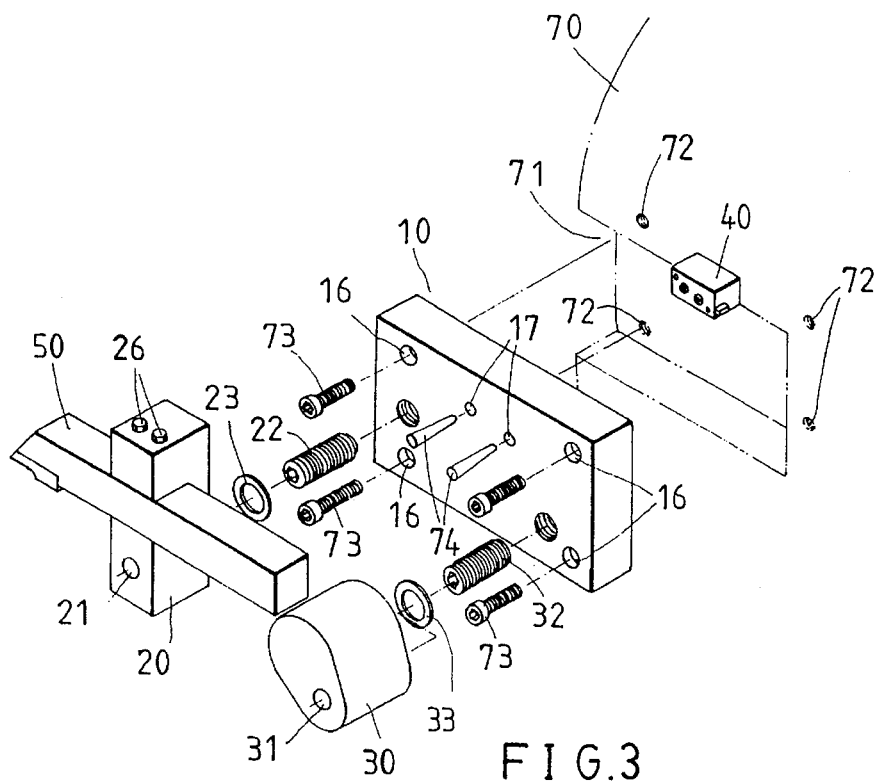
FIG. 3 is an exploded view showing that the first preferred embodiment of the present invention is incorporated into a CNC lathe tool mount of a disklike construction.
Figure 4:
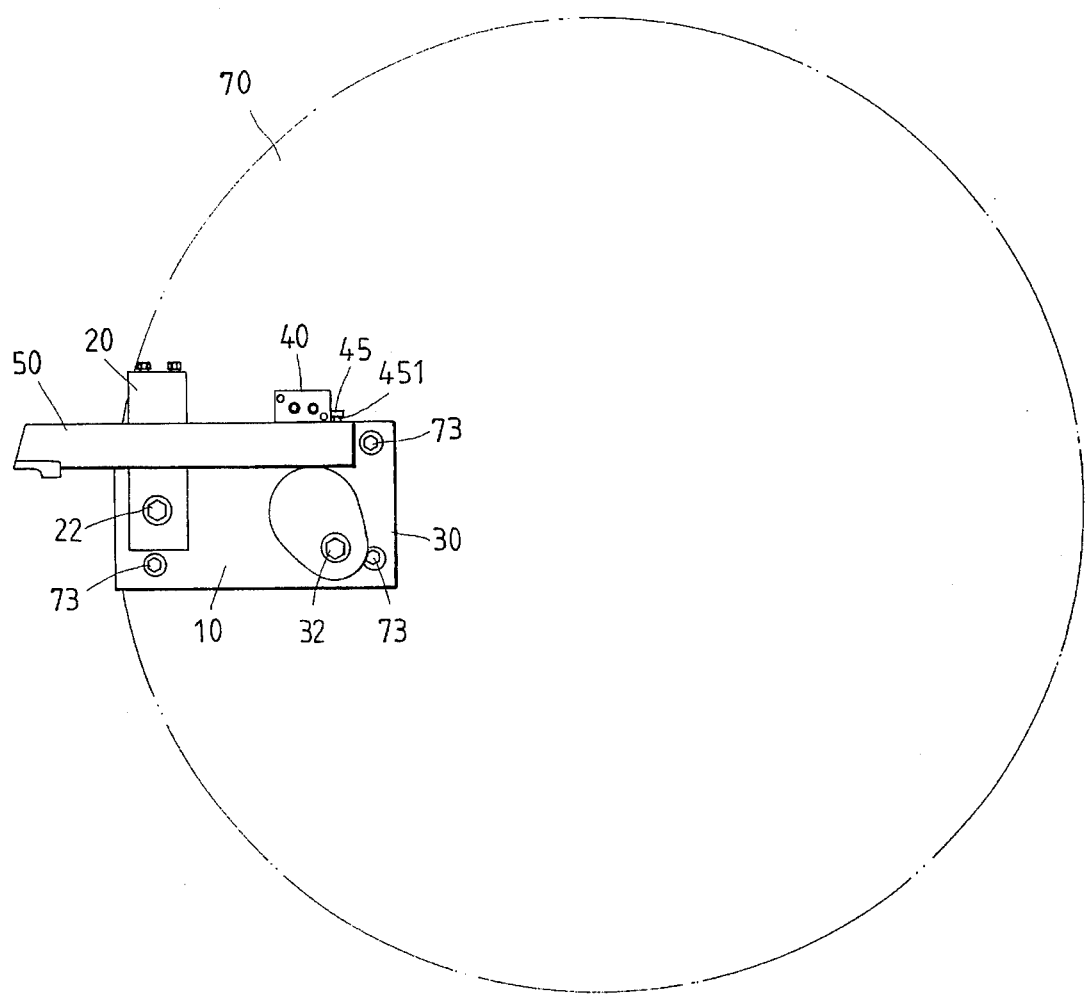
FIG. 4 shows a perspective view of the first preferred embodiment in combination according to the present invention as shown in FIG. 3.
Figure 5:
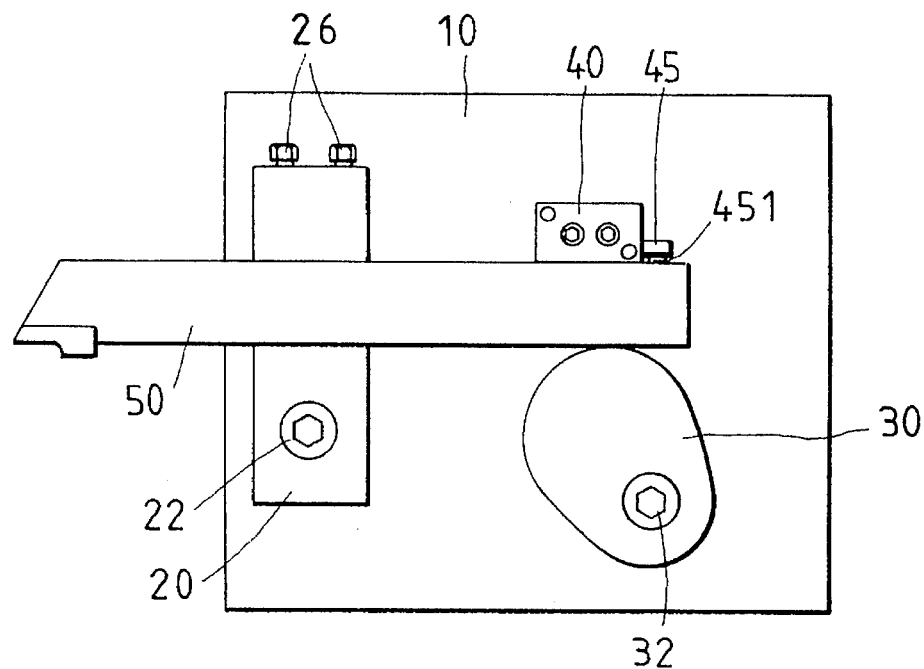
FIG. 5 is a front view of the first preferred embodiment of the present invention which is shown in FIG. 2 and is in the state of a normal operation.

As shown in FIGS. 3 and 4, a CNC lathe is provided with a lathe tool mount 70 of a disklike construction and having a plurality of cells 71 and four screw holes 72. The support base 10 is provided horizontally at the front end thereof with four fish-eye through holes 16 and two pin holes 17. As a result, the support base 10 can be secured to the cells 71 and two pins 74, which are engageable respectively with the four through holes 16 and the two pin holes 17. The support base 10 is so shaped as to permit the locating block 40 to be fastened securely to a predetermined location of the disklike lathe tool mount 70.

Figure 6:
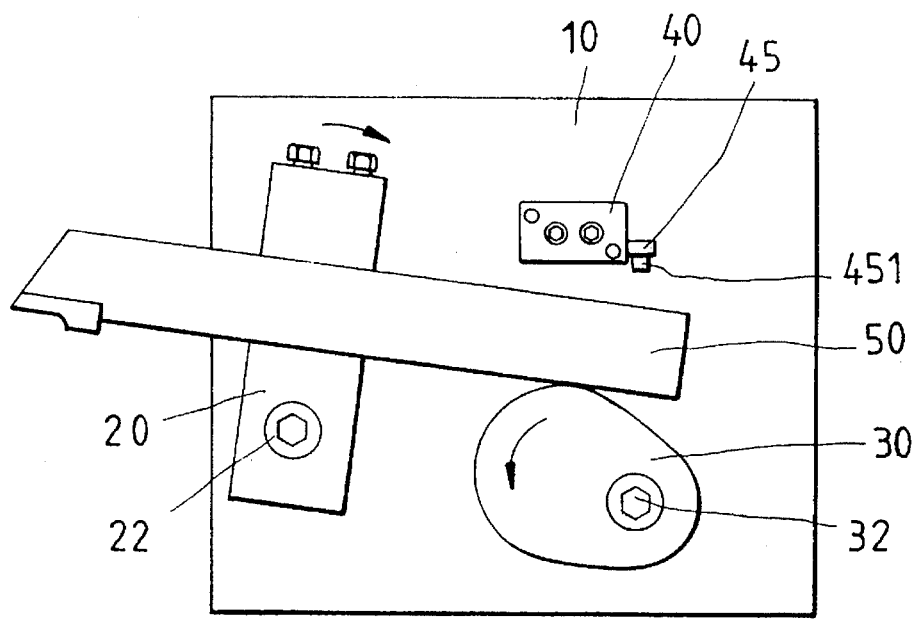
FIG. 6 is a front view of the first preferred embodiment of the present invention which is shown in FIG. 2 and is in the midst of an impact incident causing the lathe tool to be overloaded.

In operation, the front end of the lathe tool 50 is received securely in the slot 24 of the front holding base 20 by means of the screws 26 when the machining process is under way. The front holding base 20 is provided with the screw 22 and the resilient washer 23, by means of which the front holding base 20 is fastened with the support base 10 having the screw hole 13 engageable with the screw 22. The fastening moment of force of the front holding base 20 can be set by adjusting the screw 22 with a hexagonal wrench via the through hole 21 of the front holding base 20. In the meantime, the rear end of the handle of the lathe tool 50 is in contact with the locating block 40 such that the press plate 451 of the proximity switch is pressed by the rear end of the handle of the lathe tool 50 so as to connect the lathe with the power source. Moreover, the handle of the lathe tool 50 is urged at the rear end thereof by the rear holding base eccentric cam 30. The fastening moment of force of the rear holding base eccentric cam 30 can be set by adjusting the screw 32 with a hexagonal wrench via the through hole 31 of the cam 30. As a result, the lathe tool 50 can be disposed horizontally such that one end the lathe tool 50 is supported by the front holding base 20, and that another end of the lathe tool 50 is held securely under the locating block 40 by the rear holding base eccentric cam 30. The lathe tool 50 is therefore provided in advance with a fastening moment of force and a sustaining force so as to enable the blade of the lathe tool 50 to resist the component of force exerting thereon when the machining process is under way. The values of the fastening moment of force and the sustaining force can be determined by a structural analysis of static instability. On the basis of the structural analysis of static instability, the screws 22, 32, and the resilient washers 23, 33 are made of a material having a predetermined property. When the machining process is in progress, the lathe tool 50 may be impacted on improperly by a work piece due to errors in a numerical control program or a human error in operation. At the moment when such an incident as described above takes place, the impact fore is generally several times greater than the machining force, thereby causing the torque direction to be opposite to the fastening moment of force exerting on the lathe tool 50 by the front holding base 20 and the rear holding base eccentric cam 30. When the impact torque is far greater than the fastening moment of force, the front holding base 20 is caused to rotate clockwise so as to actuate synchronously the lathe tool 50 and the rear holding base eccentric cam 30 to encircle respectively the axes of the screws 22 and 32, thereby causing the blade of the lathe tool 50 to move upwardly, outwardly and eccentrically. In other words, the blade of the lathe tool 50 is caused to move away from the work piece by swiveling along an arcuate track. In the meantime, the rear end of the handle of the lathe tool 50 is caused to displace, as shown in FIG. 6, so as to relieve the press plate 451 of the proximity switch 45 of the pressure exerting thereon. As a result, the power supply of the main shaft motor of the lathe is interrupted instantly, thereby bringing the machining operation of the lathe to a complete halt.

It must be noted here that the impact force referred to above can be absorbed effectively by an action of the lathe tool 50 which is caused by the residual load of the impact load to displace at an initial angular acceleration by encircling the axis of the screw 22.

Figure 7:
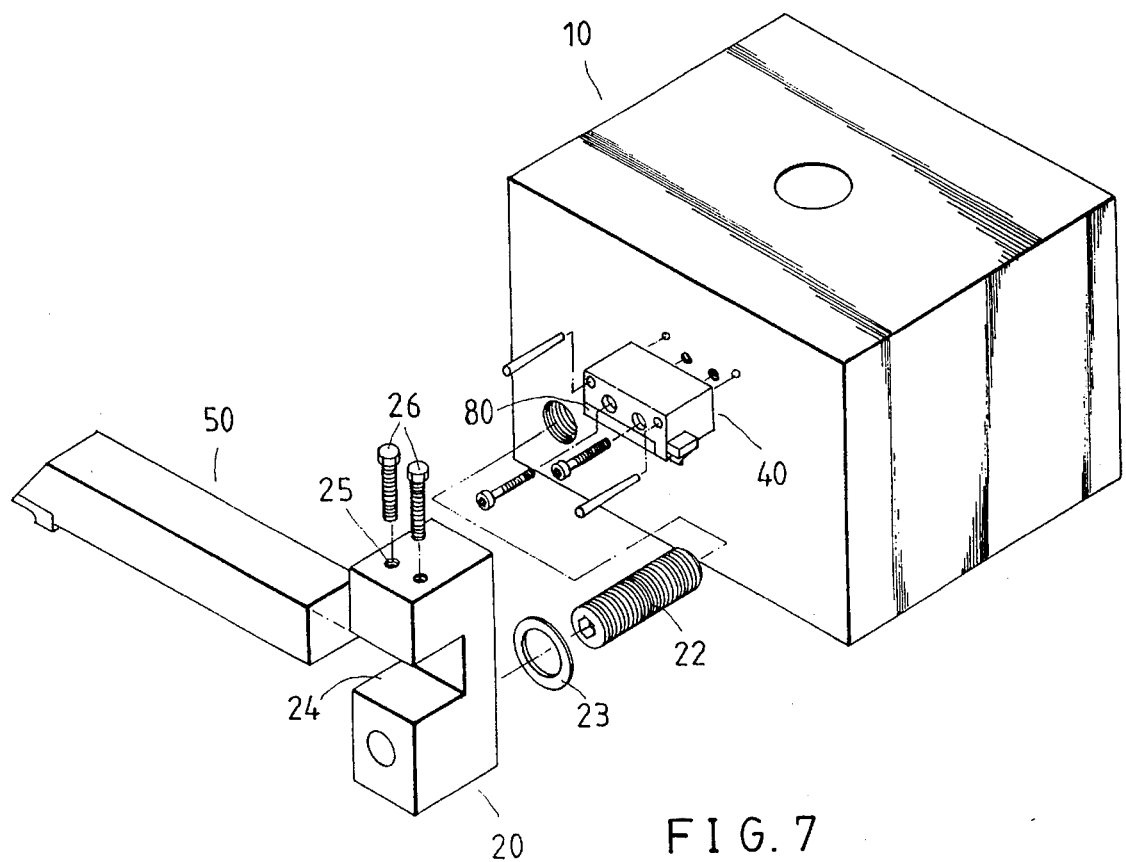
FIG. 7 shows an exploded view of a second preferred embodiment of the present invention.
Figure 8:
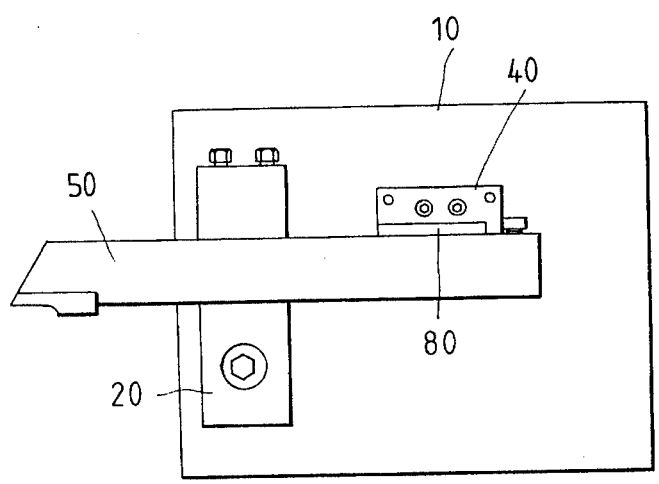
FIG. 8 shows a plan view of the second preferred embodiment in combination according to the present invention as shown in FIG. 7.

As shown in FIGS. 7 and 8, the second preferred embodiment of the present invention comprises a support base 10, a front holding base 20, a locating block 40, and a permanent magnetic block 80 which is disposed securely under the locating block 40. The lathe tool 50 is held in such a manner that the lathe tool 50 is supported at one end thereof by the front holding base 20, and that the lathe tool 50 is attracted at another end thereof by the magnetic block 80. As a result, the lathe tool 50 is provided in advance with a fastening moment of force and an attracting force, which are intended to resist the machining component of force exerting on the blade of the lathe tool 50 when the machining process is under way. The value of the magnetic attraction of the magnetic block 80 can be determined by a structural analysis of static instability. In addition, the lathe tool 50 may be held at the rear end thereof by the rear holding base eccentric cam 30 in conjunction with the magnetic block 80, thereby enabling the prestress of the rear end of the lathe tool 50 to act as an urging force and a magnetic attraction.

The machining process of the embodiments described above is carried out in such a manner that the blade of the lathe tool 50 faces downward. However, the machining process may be so modified that the blade of the lathe tool 50 faces upwardly, and that other component parts of the present invention may be adjusted accordingly. In addition, the fastening means 23 and 33 of the front holding base 20 and the rear holding base eccentric cam 30 may be also modified in other specific forms. The present invention is therefore to be limited only by the scope of the following appended claims.

What is claimed is:

1. A device fot stopping automatically an overloaded lathe comprising:

a support base of a rectangular construction and provided with two threaded holes;

a front holding base provided at a front end thereof with a through hole having at a rear end thereof a threaded portion engageable with one end of a fastening means having another end engageable with one of said two threaded holes of said support base, said fastening means having a resilient washer fitted thereover and located between said support base and said front holding base, said front holding base further provided centrally at a front end thereof with a front end of a handle of a lathe tool;

a rear holding base eccentric cam provided with a through hole having at a rear end thereof a threaded portion engageable with one end of a fastening means having another end engageable with another one of said two threaded holes of said support base, said fastening means having a resilient washer fitted thereover and located between said support base and said rear holding base eccentric cam which is disposed in such a manner that said handle of said lathe tool is urged at a rear end thereof by said rear holding base eccentric cam; and a locating block fastened with said support base such that said locating block is corresponding in location to said rear holding base eccentric cam, and that said rear end of said handle of said lathe tool is urged by said locating block, and further that said locating block is provided adjacently with a proximity switch having a plate capable of pressing one end of said handle of said lathe tool so as to connect an electric circuit of said proximity switch with a main shaft motor of a lathe.

2. The device as defined in claim 1, wherein said support base is provided centrally at a top thereof with a through hole.

3. The device as defined in claim 1, wherein said support base is provided at a front end thereof with four fish-eye holes.

4. The device as defined in claim 1, wherein said support base is provided at a front end thereof with two pin holes.

5. A device for stopping automatically an overloaded lathe comprising:

a support base of a rectangular construction and provided with two threaded holes;

a front holding base provided at a front end thereof with a through hole having at a rear end thereof a threaded portion engageable with one end of a fastening means having another end engageable with one of said two threaded holes of said support base, said fastening means provided with a resilient washer fitted thereover and located between said support base and said front holding base which is provided centrally at a front end thereof with a front end of a handle of a lathe tool;

a locating block fastened with said support base such that said locating block is located on the same front end of said support base as said front holding base, and that said locating block is provided adjacently with a proximity switch having a plate capable of pressing one end of said handle of said lathe tool so as to connect an electric circuit of said proximity switch with an electric circuit of a main shaft motor of a lathe; and a permanent magnetic block disposed under said locating block and capable of attracting a rear end of said handle of said lathe tool; and further comprising a rear holding base eccentric cam provided with a through hole having at a rear end thereof a threaded portion engageable with one end of a fastening means having another end engageable with another one of said two threaded holes of said support base, said rear holding base eccentric cam fastened with said support base such that said rear holding base eccentric cam is corresponding in location to said magnetic block, and that said handle of said lathe tool is urged at a rear end thereof by said rear holding base eccentric cam, said fastening means provided with a resilient washer fitted thereover and located between said support base and said rear base holding base eccentric cam.

6. The device as defined in claim 5, wherein said support base is provided centrally at a top thereof with a through hole.

7. The device as defined in claim 5, wherein said support base is provided at a front end thereof with four fish-eye holes.

8. The device as defined in claim 5, wherein said support base is provided at a front end thereof with two pin holes.

9. A device for stopping automatically an overloaded lathe comprising:

a support base of a rectangular construction and provided with two threaded holes;

a front holding base fastened with the front end of the support base by means of a screw, said screw means having a resilient washer fitted thereover and located between said support base and said front holding base, said front holding base further provided centrally at a front end thereof with a front end of a handle of a lathe tool;

a rear holding base eccentric cam fastened with the front end of the support base by means of screw, said screw means having a resilient washer fitted thereover and located between said support base and said rear holding base eccentric cam which is disposed in such a manner that said handle of said lathe tool is urged at a rear end thereof by said rear holding base eccentric cam; and a locating block fastened with said support base such that said locating block is corresponding in location to said rear holding base eccentric cam, and that said rear end of said handle of said lathe tool is urged by said locating block, and further that said locating block is provided adjacently with a proximity switch having a plate capable of pressing one end of said handle of said lathe tool so as to connect an electric circuit of said proximity switch with an electric circuit of a main shaft motor of a lathe.

10. The device as defined in claim 9, wherein said support base is provided centrally at a top thereof with a through hole.

11. The device as defined in claim 9, wherein said support base is provided at a front end thereof with four fish-eye holes.

12. The device as defined in claim 9, wherein said support base is provided at a front end thereof with two pin holes.

* * * * *